Dec. 29, 1942. A. PETERSON 2,306,748
SEED PLANTER
Filed July 5, 1941
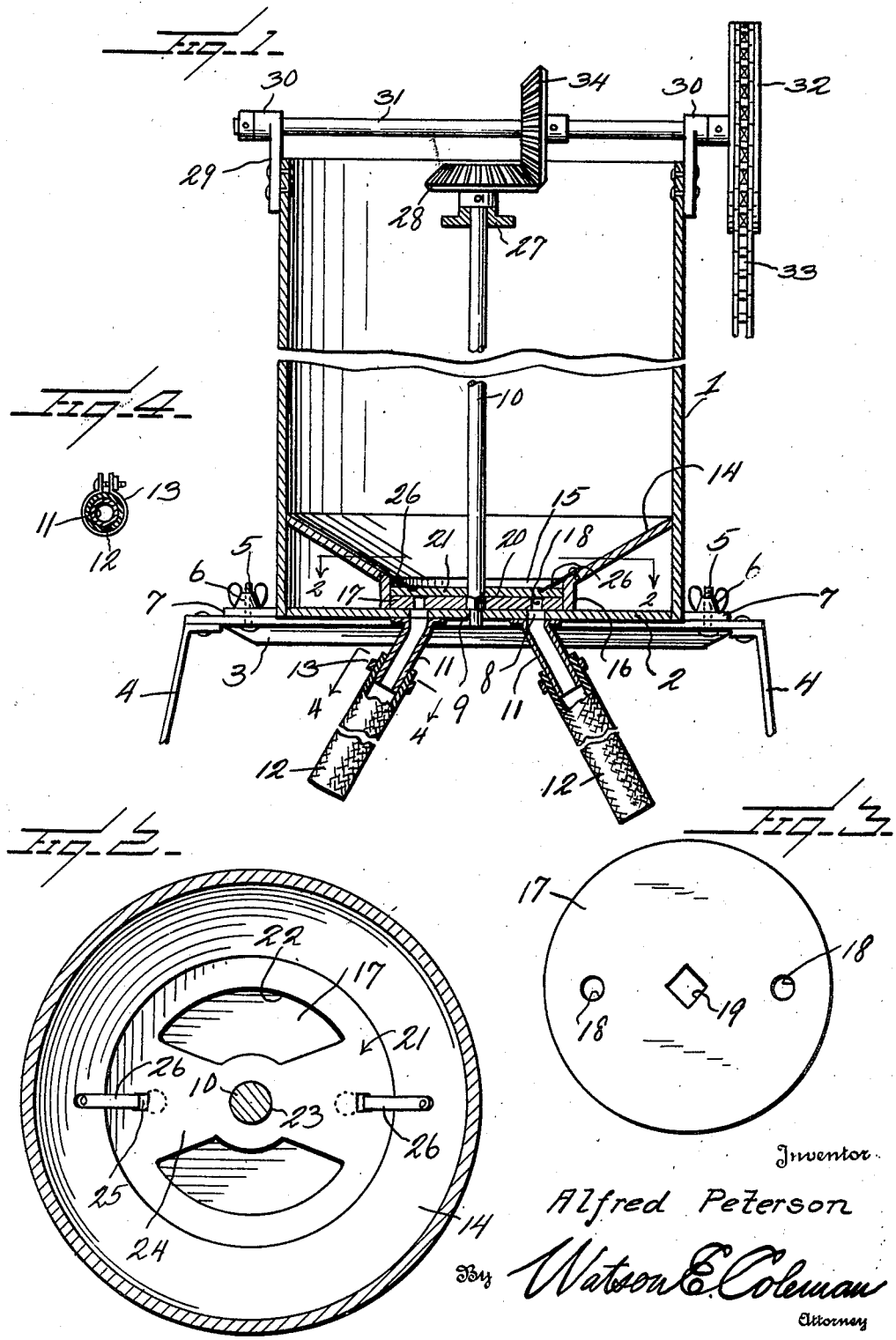
Inventor
Alfred Peterson
By Watson E. Coleman
Attorney Patented Dec. 29, 1942

2,306,748

UNITED STATES PATENT OFFICE 2,306,748

SEED PLANTER

Alfred Peterson, Lyford, Tex.

Application July 5, 1941, Serial No. 401,275

5 Claims. (Cl. 221—131)

This invention relates generally to the class of farm or agricultural implements and pertains particularly to improvements in seed planters.

The primary object of the present invention is to provide in a seed planter a hopper having an improved seed feeding mechanism which employs only two cooperating plate members and which is so designed that the seed plate member may be easily and quickly removed for replacement by a seed plate of a different thickness, whereby different types of seeds may be discharged from the planter as desired.

Another object of the invention is to provide a seed planter structure having a seed feeding mechanism of simple but strong and durable construction, and having a cooperative relationship with a seed receptacle which permits of the seed feed plate being readily removed for replacement by another plate of a different thickness designed to handle a different type of seed.

Still another object of the invention is to provide in a seed planter a construction wherein a cover plate and a feed plate are so cooperatively arranged within the seed receptacle that automatic adjustment of the cover plate is had when the seed plate is replaced by a plate of a different thickness, so that the seed and cover plates are at all times maintained in proper operating position, one upon the other.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Figure 1 is a view in vertical section through a seed planter constructed in accordance with the present invention;

Figure 2 is a horizontal section taken on the line 2—2 of Figure 1;

Figure 3 is a view in plan of a seed plate per se;

Figure 4 is a sectional view on the line 4—4 of Figure 1.

Referring now more particularly to the drawing, the numeral 1 generally designates a receptacle in the lower part of which the seed feeding mechanism is arranged in the manner hereinafter described.

In accordance with the present invention the bottom 2 of the receptacle 1 is removable and is supported upon a supporting frame 3 which, in turn, is connected with and supported on a suitable carrier mechanism, not shown, through the medium of supporting arms or brackets 4.

The bottom 2 of the receptacle is secured in the lower part of the receptacle by means of the threaded bolts 5 and wing nuts 6 which engage ears 7 which are formed integrally with the wall of the receptacle.

The bottom 2 of the receptacle is provided with a pair of seed discharge openings 8 which are disposed upon opposite sides of a central shaft bearing opening 9 which, when the bottom is in position in the receptacle, is upon the axial center of the receptacle to receive the reduced lower end of a shaft 10.

Secured to the under side of the bottom 2 are the two seed discharging tubes 11 each of which has one end in covering relation with an opening 8 to receive seed therefrom. These tubes are relatively short and are downwardly divergently directed as shown and each has connected therewith a flexible seed discharge or carrying tube 12 which may be clamped to its tube 11 by a split clamping band 13 such as is shown in Figure 4.

Within the lower part of the receptacle 1 is a false bottom 14 which is of funnel form and has a central relatively large opening 15 which is defined by the downwardly directed annular collar 16. As shown, the lower edge of the collar 16 rests upon the bottom 2 while the periphery of the false bottom 14 is in contact with the wall 1 of the receptacle.

Within the opening 15 of the bottom 14 there is located a seed disk or plate 17 which is provided with two seed apertures 18 arranged upon opposite sides of a central opening 19 of polygonal form, the apertures 18 being spaced the same distance apart as the openings 8 in the bottom 2.

The shaft 10, above the reduced portion 9, is of polygonal cross-section, as indicated at 20, to correspond with the cross-section of the aperture 19 in the seed disk so that engagement of this portion of the shaft in the central aperture of the disk will lock the shaft and disk together so that rotary motion may be transmitted through the shaft to the disk.

Lying over and upon the top of the seed disk 17 is a holder plate of disk form which snugly fits in the opening 15, as shown in Figure 1, and which, as is shown in Figure 2, comprises the plate body 21 having formed therethrough the two opposite concentric sector openings 22 and a central shaft opening 23. The openings 22 thus have formed between them the fan-like web portion 24 and the plate 21 is positioned in the bottom opening 15 so that each of these web portions 24 covers or overlies a bottom opening 8.

As shown, the circular portion of the shaft 10 above the polygonal portion 20 passes through the opening 23 of the plate 21 so that the shaft may turn independently of the plate 21.

In order to hold the plate 21 against movement around the shaft each of the web portions 24 is provided in its top surface with a notch 25 and there is secured to the bottom 14 the pair of spring fingers 26 which are oppositely disposed and each of which extends beyond the collar 16 into the opening 15 for engagement in a notch 25 of the plate 21. Thus, these spring fingers act as latches to maintain the plate 21 in fixed position against turning upon the top of the seed disk 17 but are yieldable to permit limited axial movement of the plate 21 upon the shaft 10.

In the upper part of the receptacle 1 there is arranged a suitable transverse bar 27 in which the upper end of the shaft 10 is rotatably mounted and upon the upper end of the shaft 10 above the bar 27 is secured a miter gear 28 which may have a bearing rest upon the bar 27.

At opposite sides of the receptacle 1 are mounted bearing brackets 29 each of which carries a bearing sleeve 30 and extending radially across the upper end of the receptacle is a shaft 31 which passes through and is supported by the bearings 30, as shown. Upon one end of this shaft is mounted a suitable wheel by which the transmisison of power to the shaft 31 is effected, the wheel here shown being in the form of a sprocket wheel 32 to which is shown connected a portion of a power transmitting sprocket chain 33. Obviously, the invention is not to be considered as limited to the use of this particular means for transmitting power to the shaft 31, since any other type of operating means may be employed for turning the shaft.

The shaft 31 has secured thereto the miter gear 34 which is in toothed connection with the gear 28 so that rotary motion of the shaft 31 can be transmitted to the vertical shaft 10 and consequently to the seed plate 17.

It will be readily apparent from the foregoing that the seed planter device herein described is of relatively simple construction and can, therefore, be economically produced. It will also be readily apparent that by the removal of the bottom 2 the seed plate 17 may be taken out to be replaced by a thicker or thinner plate as desired in accordance with the character of the seed to be handled by the planter mechanism.

I claim:

1. In a seed planter, a receptacle having a bottom leading to a central opening, a plate fixed against turning in said opening but having axial movement therein, said plate having an opening therethrough, a second plate lying beneath the first plate and having a seed aperture therethrough, means for rotating the second plate whereby the seed aperture thereof passes beneath the opening of the first plate and registers therewith, means supported beneath the receptable and positioned to have the aperture of the second plate pass thereover, for receiving seed from the second plate aperture, and yieldable elements secured to the bottom and bearing down on the first plate and yieldingly resisting axial movement thereof while the second plate is turning.

2. A seed planter comprising a receptacle having an inclined bottom leading to a central opening, a shaft disposed axially in said opening, a pair of circular plates disposed concentrically in the opening, one upon the other, the upper one of said plates having a slot therein, the lower one of the plates having a seed aperture formed therethrough in position to register with the slot when the lower plate is rotated relative to the first plate, said shaft being coupled with the lower plate, means for rotating the shaft, means located beneath the receptacle and below the seed aperture of the lower plate to receive seed therefrom, and resilient fingers each secured at one end to the inclined bottom and coupled at its other end with the upper plate to hold the same against turning, but yieldable for axial movement of the upper plate away from the lower plate.

3. A seed planter comprising a receptacle having a sloping bottom leading to a central opening, said opening being circular, a pair of disk plates disposed one upon the other in said opening, a shaft extending through the centers of said plates and connected with the lower one thereof, means holding the upper one of the plates against rotation, said means being yieldable to permit the upper plate to move axially in the opening, means for rotating the shaft, said upper plate having a sector slot formed therein, the lower plate having a seed aperture therein in a position to register with the sector slot upon rotation of the lower plate, and a seed receiving tube beneath the receptacle having one end disposed with respect to the lower plate to have the lower plate aperture register therewith upon rotation of the lower plate.

4. A seed planter comprising a receptacle having a sloping bottom leading to a central circular opening, a collar defining and extending downwardly from said opening, a pair of disk plates disposed one upon the other within said opening and encircled by said collar, a shaft co-axial with said plates and operatively connected with the lower one thereof, means for rotating said shaft for imparting rotation to the lower plate, a yieldable holding means carried by the receptacle bottom and engaging the upper one of said plates to maintain the same against turning but permitting axial movement thereof within the collar, the upper one of said plates having a sector slot therein, the lower one of the plates having a seed aperture therein arranged to register with the slot upon rotation of the lower plate, and a seed tube beneath the receptacle having one end positioned to register with the aperture of the lower plate upon rotation of the latter.

5. A seed planter comprising a receptacle having a flat removable bottom, a false bottom in the receptacle having a sloping circular portion leading to a central opening, a collar defining and extending downwardly from said opening to rest upon the first mentioned bottom, means for removably securing the first bottom in the lower part of the receptacle, a pair of disk plates disposed within said opening and encircled by said collar, means carried by the false bottom having engagement with the upper one of the disk plates and securing the same against rotation, the last mentioned means being yieldable for axial movement of the upper disk plate in the collar, a shaft passing freely through the upper plate and having connection with the lower plate, means for effecting rotation of the shaft, a sector slot in the upper plate concentric with the shaft, an aperture in the lower plate arranged to register with the sector slot upon rotation of the lower plate, the first mentioned bottom having an opening positioned to register with the aperture of the lower plate upon rotation of the latter, and a tube connected with the first mentioned bottom and having an end in register with the opening of said bottom.

ALFRED PETERSON.